(12) United States Patent
Shimazawa et al.

(10) Patent No.: US 6,400,535 B1
(45) Date of Patent: *Jun. 4, 2002

(54) MAGNETORESISTIVE EFFECT MULTI-LAYERED STRUCTURE AND THIN-FILM MAGNETIC HEAD WITH THE MAGNETORESISTIVE EFFECT MULTI-LAYERED STRUCTURE

(75) Inventors: Koji Shimazawa; Tetsuro Sasaki; Manabu Ohta, all of Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,314

(22) Filed: Mar. 4, 1999

(30) Foreign Application Priority Data

Mar. 18, 1998 (JP) .......................................... 10-088280

(51) Int. Cl.$^7$ ................................................ G11B 5/66
(52) U.S. Cl. ................... 360/324.11; 324/252; 428/692
(58) Field of Search .......................... 360/324.1, 324.11; 324/207.21, 252; 338/32 R; 428/692

(56) References Cited

U.S. PATENT DOCUMENTS

| 5,795,663 A | * | 8/1998 | Koike et al. ................. 428/692 |
| 5,932,343 A | * | 8/1999 | Hayashi et al. .............. 428/332 |
| 5,933,297 A | * | 8/1999 | Hoshiya et al. .............. 360/113 |
| 5,955,211 A | * | 9/1999 | Maeda et al. ................. 428/692 |
| 6,034,845 A | * | 3/2000 | Nagasaka et al. ............ 360/113 |
| 6,038,107 A | * | 3/2000 | Pinarbasi ..................... 360/113 |
| 6,040,961 A | * | 3/2000 | Gill ............................. 360/113 |
| 6,051,309 A | * | 4/2000 | Fujikata et al. .............. 428/332 |

FOREIGN PATENT DOCUMENTS

| JP | 6-314617 | * | 11/1994 |
| JP | 9-82524 | * | 3/1997 |

OTHER PUBLICATIONS

Charles Kittel, "Introduction to Solid State Physics", Sixth Edition, pp. 502–505, 1986.

* cited by examiner

*Primary Examiner*—Brian E. Miller
(74) *Attorney, Agent, or Firm*—Arent Fox Kintner Plotkin & Kahn, PLLC

(57) ABSTRACT

A MR multi-layered structure or a thin-film magnetic head with the MR multi-layered structure includes a non-magnetic electrically conductive material layer, first and second ferromagnetic material layer separated by the non-magnetic electrically conductive material layer, and an anti-ferromagnetic material layer formed adjacent to and in physical contact with one surface of the second ferromagnetic material layer, the one surface being in opposite side of the non-magnetic electrically conductive material layer. The second ferromagnetic material layer includes a first layer of a ferromagnetic material containing Co, and a second layer of a ferromagnetic material with a smaller magnetic anisotropy than that of Co.

14 Claims, 2 Drawing Sheets

21 PINNED DIRECTION AT PIN ANNEAL PROCESS
20
22 APPLIED MAGNETIC FIELD FOR MEASURMENT

MAGNETORESISTIVE EFFECT MULTI-LAYERED STRUCTURE AND THIN-FILM MAGNETIC HEAD WITH THE MAGNETORESISTIVE EFFECT MULTI-LAYERED STRUCTURE

FIELD OF THE INVENTION

The present invention relates to a magnetoresistive effect (MR) multi-layered structure especially using giant magnetoresistive effect (GMR) such as spin valve effect, and a thin-film magnetic head with the MR multi-layered structure used for a HDD (Hard Disk Drive) unit.

DESCRIPTION OF THE RELATED ART

Recently, thin-film magnetic heads with MR sensors based on spin valve effect of GMR characteristics are proposed (U.S. Pat. Nos. 5,206,590 and 5,422,571) in order to satisfy the requirement for ever increasing data storage densities in today's magnetic storage systems like HDD units. The spin valve effect thin-film structure includes first and second thin-film layers of a ferromagnetic material separated by a thin-film layer of non-magnetic metallic material, and an adjacent layer of anti-ferromagnetic material is formed in physical contact with the second ferromagnetic layer to provide exchange bias magnetic field by exchange coupling at the interface of the layers. The magnetization direction in the second ferromagnetic layer is constrained or maintained by the exchange coupling, hereinafter the second layer is called "pinned layer". On the other hand the magnetization direction of the first ferromagnetic layer is free to rotate in response to an externally applied magnetic field, hereinafter the first layer is called "free layer". The direction of the magnetization in the free layer changes between parallel and anti-parallel against the direction of the magnetization in the pinned layer, and hence the magneto-resistance greatly changes and giant magnetoresistance characteristics are obtained.

The output characteristic of the spin valve MR sensor depends upon the angular difference of magnetization between the free and pinned ferromagnetic layers. The direction of the magnetization of the free layer is free to rotate in accordance with an external magnetic field. That of the pinned layer is fixed to a specific direction (called as "pinned direction") by the exchange coupling between this layer and adjacently formed anti-ferromagnetic layer.

In this kind of spin valve effect MR sensor, the direction of the magnetization of the pinned layer may change in some cases by various reasons. If the direction of the magnetization changes, the angular difference between the pinned and free layers changes too and therefore the output characteristic also changes. Consequently stabilizing the direction of the magnetization in the pinned layer is very important.

In order to stabilize the direction of the magnetization by the strong exchange coupling between the pinned and anti-ferromagnetic layers, a process of temperature-annealing (pin anneal process) is implemented under an external magnetic field with a specific direction. The pin annealing is done by elevating the temperature up to the Neel point and then cooling down to room temperature under the magnetic field in the direction to be pinned. By this pin anneal process, the exchange coupling is regulated at the interface of the pinned and anti-ferromagnetic layers toward the direction of the externally applied magnetic field.

However, the magnetoresistance characteristics may be changed under actual high temperature operation of a HDD unit, even if the pin anneal processing is properly implemented. This degradation is caused by the high temperature stress during operation of the HDD unit and by the magnetic field by a hard magnet layer used for giving a bias magnetic field to the free layer.

The detail of this degradation is as follows. The pinned direction of the magnetization in the pinned layer is different from that of the magnetic field ($H_{HM}$) by the hard magnet. And hence the direction of the magnetization of pinned layer which is contacted with the anti-ferromagnetic layer is slightly rotated toward the direction of $H_{HM}$ (hereinafter this direction of the magnetization of the pinned layer is expressed as $\theta_p$). In the anti-ferromagnetic material layer, the Neel point temperature differs from location to location inside the layer from macroscopic point of view, and it is distributed in a certain range of temperature. Even if the temperature is less than the "bulk" Neel point (average Neel point), there could be small area whose micro Neel point temperature is low and where the exchange coupling with the pinned layer disappears. When such spin valve effect MR sensor is operated at a high temperature T, which is less than the blocking temperature at which the exchange couplings of all microscopic areas disappear, and then cooled down to usual room temperature, some microscopic area whose Neel temperatures are less than T is effectively annealed again and the direction of the magnetization is rotated in the direction of $\theta_p$. The total amount of the $\theta_p$ and the rotated amount component will change the exchange coupling state between the anti-ferromagnetic layer and the adjacent ferromagnetic layer to determine the new pinned direction of the magnetization of the magnetic structure. The new pinned direction will vary depending upon the period of time kept at high temperature because the magnetic characteristics of the ferromagnetic layer is changing over with time under the high temperature.

As stated in the above paragraph, usage of such spin valve MR sensor at high temperature may cause a change of the pinned direction of the magnetization in the pinned layer, and the electrical output characteristics of the sensor are degraded in signal levels, and waveform symmetry.

In order to prevent the above-mentioned problems from occurring, it had been desired that material having a high blocking temperature and possible to provide smaller Neel temperature distribution is used for the anti-ferromagnetic layer.

Japanese Patent Unexamined Publication No. 6(1994)-314617 discloses usage of a specific material for the anti-ferromagnetic layer to obtain improved exchange coupling. Also, Japanese Patent Unexamined Publication No. 9(1997)-82524 discloses insertion of an intermediate layer for improving lattice matching between the anti-ferromagnetic and pinned layers in order to obtain strong exchange coupling in the interface.

As disclosed in these publications, usage of the specific material for the anti-ferromagnetic layer and usage of intermediate layer between the interface of the anti-ferromagnetic and pinned layers have been proposed to enhance the exchange coupling and to stabilize the pinned direction. However, no one has approached to control the magnetic characteristics of the pinned ferromagnetic layer itself to stabilize the pinned direction.

SUMMARY OF THE INVENTION

It is therefore an object of the present invention to resolve the aforementioned problems by using a new approach, and to provide a MR multi-layered structure and a thin-film magnetic head with the MR multi-layered structure, whereby pinned direction can be kept in stable at high temperature.

According to the present invention, a MR multi-layered structure or a thin-film magnetic head with the MR multi-layered structure includes a non-magnetic electrically conductive material layer, first and second ferromagnetic material layer separated by the non-magnetic electrically conductive material layer, and an anti-ferromagnetic material layer formed adjacent to and in physical contact with one surface of the second ferromagnetic material layer, the one surface being in opposite side of the non-magnetic electrically conductive material layer. The second ferromagnetic material layer includes a first layer of a ferromagnetic material containing Co, and a second layer of a ferromagnetic material with a smaller magnetic anisotropy than that of Co. The first layer is stacked on the non-magnetic electrically conductive material layer, and the second layer is stacked on the first layer.

In other words, according to the present invention, the second ferromagnetic material layer (pinned layer) has a first layer which is made of a ferromagnetic material containing Co and stacked on the non-magnetic electrically conductive material layer, and a second layer which is made of a ferromagnetic material with a smaller magnetic anisotropy factor than that of Co and stacked on a surface of the first layer that faces to the anti-ferromagnetic material layer. Thus, the total magnetic anisotropy factor of the pinned layer is reduced to realize smaller magnetic variations under high temperature atmosphere, and hence a spin valve effect MR sensor with more stable direction of the magnetization of the pinned layer under high temperature atmosphere is realized. By stabilizing the direction of the magnetization of the pinned layer, the degradations of signal level and waveform symmetry of output waveforms under high temperature atmosphere (for example at about 125° C.) can be greatly reduced.

It is preferred that the second layer is made of a ferromagnetic material of Fe alloy. In one embodiment according to the present invention, the ferromagnetic material of Fe alloy may be selected one of ferromagnetic materials of CoFe, FeSi and NiFe.

It is also preferred that the second layer is made of a ferromagnetic material of Ni alloy. In one embodiment according to the present invention, the ferromagnetic material of Ni alloy may be selected one of ferromagnetic materials of FeNi, NiCo and NiCu.

It is preferred that the second layer is made of an amorphous magnetic material alloy.

Preferably, the second layer has a thickness of 0.5 nm or more.

It is also preferred that the first layer is made of a ferromagnetic material of Co or CoFe.

Further objects and advantages of the present invention will be apparent from the following description of the preferred embodiments of the invention as illustrated in the accompanying drawings.

DESCRIPTION OF THE PREFERRED EMBODIMENTS

Figure 1:
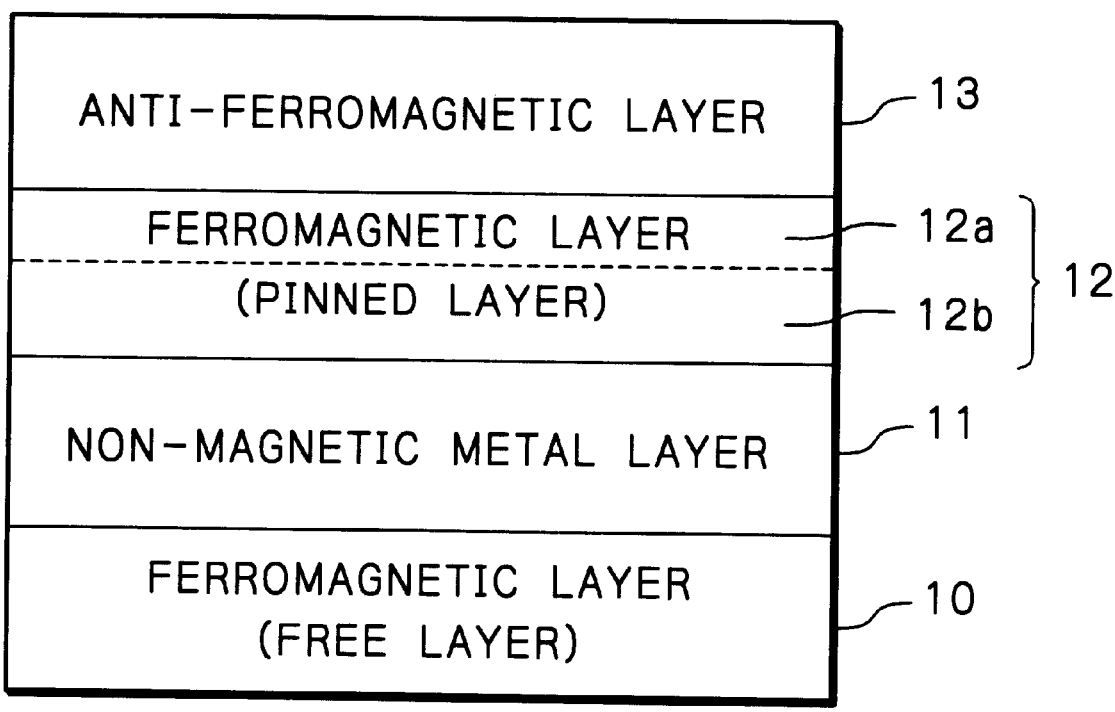
FIG. 1 shows a cross-sectional view of a spin valve effect multi-layered structure formed in a spin valve effect MR sensor of a thin-film magnetic head as a preferred embodiment according to the present invention.

FIG. 1 illustrates stacked thin-film layers of a spin valve effect MR sensor. Referring to FIG. 1, reference numerals 10 and 12 denote first and second ferromagnetic thin-film layers respectively which are separated by a thin-film layer 11 of a non-magnetic electrically conductive metallic material. On the second ferromagnetic thin-film layer 12, a thin-film layer 13 of anti-ferromagnetic material is stacked, and a magnetic field generated by the exchange coupling at the interface of the thin-film layers 12 and 13 magnetizes the ferromagnetic layer 12, and so to speak the layer is pinned. Thus, the second ferromagnetic layer 12 is called as a pinned layer. The first ferromagnetic thin-film layer 10 is a free layer in which there is no effect of exchange coupling and hence the magnetization is free to rotate in response to an externally applied magnetic field.

In this embodiment, the pinned layer 12 has a two layered structure composed of a second thin-film layer 12b of ferromagnetic material containing Co and a first layer 12a of ferromagnetic material with a smaller magnetic anisotropy than that of Co. The first layer 12a is stacked on the surface of the second layer 12b, which surface is opposed to the anti-ferromagnetic layer 13.

An example of the ferromagnetic material containing Co for the second layer 12b is CoFe or Co. An example of the ferromagnetic material with the smaller magnetic anisotropy than that of Co for the first layer 12a is Fe alloy such as CoFe, FeSi or NiFe, or Ni alloy such as FeNi, NiCo or NiCu. As for the composition of CoFe, preferably Co is 0–90 at %, and more preferably Co is 40 at % where its anisotropy factor becomes zero. As for the composition of FeSi, preferably Si is 0–40 at %, and more preferably Si is 20 at % where its anisotropy factor becomes zero. As for the composition of NiFe or FeNi, preferably Fe is 0–80 at %, and more preferably Fe is 20 at % where its anisotropy factor becomes zero. As for the composition of NiCo, preferably Co is 0–70 at %, and more preferably Co is 5 at % where its anisotropy factor becomes zero. As for the composition of NiCu, preferably Cu is 0–50 at %, and more preferably Cu is 35 at % where its anisotropy factor becomes zero.

It is preferred that the thickness of the first layer 12a of the ferromagnetic material with the smaller magnetic anisotropy than that of Co is 0.5 nm or more. Actually, if the layer of NiFe is formed with a thickness less than 0.5 nm, the layer may be shaped in islands and thus proper anisotropy control cannot be expected. As for the ferromagnetic material with the smaller magnetic anisotropy than that of Co for the first layer 12a, amorphous magnetic alloy can be used as well as the aforementioned Fe alloy or Ni alloy.

First Example

A first example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of $Co_{90}Fe_{10}$ (Co is 90 at % and Fe is 10 at %) with the thickness of 1.0 or 2.0 nm and a ferromagnetic material layer 12a of $Ni_{80}Fe_{20}$ (Ni is 80 at % and Fe is 20 at %) with the thickness of 0–4.0 nm, which has a smaller magnetic anisotropy than that of Co, and an anti-ferromagnetic material layer 13 of RuRhMn with the thickness of 10.0 nm, in this order.

Tables 1 and 2 show measured result of heat stability of the pinned direction when the thickness of the NiFe layer 12a of the pinned layer 12 is changed. In these Tables, Hk of the pinned layer corresponds to magnetic anisotropy factor of the pinned layer. Table 1 is in a case that the thickness of the CoFe layer 12b of the pinned layer 12 is 1.0 nm, whereas Table 2 is in a case that the thickness is 2.0 nm. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 1

Ta(5 nm)/NiFe(9 nm)/Co(1 nm)/Cu(3 nm)/$Co_{90}Fe_{10}$(1 nm)/$Ni_{80}Fe_{20}$(x)/ RuRhMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 6 | 3 | 5 | 7 |
| 3.5 | 7 | 4 | 6 | 8 |
| 3.0 | 9 | 4 | 5 | 8 |
| 2.5 | 13 | 5 | 7 | 10 |
| 2.0 | 15 | 6 | 9 | 12 |
| 1.5 | 17 | 6 | 11 | 15 |
| 1.0 | 20 | 7 | 13 | 18 |
| 0.5 | 22 | 10 | 14 | 22 |
| No NiFe Layer | 24 | 12 | 16 | 25 |

TABLE 2

Ta(5 nm)/NiFe(9 nm)/Co(1 nm)/Cu(3 nm)/$Co_{90}Fe_{10}$(2 nm)/$Ni_{80}Fe_{20}$(x)/ RuRhMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 8 | 5 | 7 | 9 |
| 3.5 | 10 | 6 | 8 | 10 |
| 3.0 | 12 | 6 | 7 | 10 |
| 2.5 | 16 | 7 | 9 | 12 |
| 2.0 | 18 | 8 | 11 | 14 |
| 1.5 | 20 | 8 | 13 | 17 |
| 1.0 | 23 | 9 | 15 | 20 |
| 0.5 | 25 | 12 | 16 | 24 |
| No NiFe Layer | 26 | 13 | 24 | 34 |

As will be apparent from these Tables 1 and 2, the rotated angle of the pinned direction decreased, namely the heat stability of the pinned direction improved by forming the NiFe layer 12a in the pinned layer 12. Also, as will be understood from Table 1, in case the thickness of the CoFe layer 12b is 1.0 nm, if the NiFe layer 12a is formed with a thickness of 2.5 nm or more, the rotated angle of the pinned direction after 1000 hours stress of heat and magnetic field becomes 10 degrees or less. Furthermore, as will be noted from Table 2, in case the thickness of the CoFe layer 12b is 2.0 nm, if the NiFe layer 12a is formed with a thickness of 3.0 nm or more, the rotated angle of the pinned direction after 1000 hours stress of heat and magnetic field becomes 10 degrees or less. As a result, degradation of the electrical output characteristics of the MR sensor due to rotation of the pinned direction during operation under the stress of about 125° C. temperature can be kept 1.5% or less.

Figure 2A:
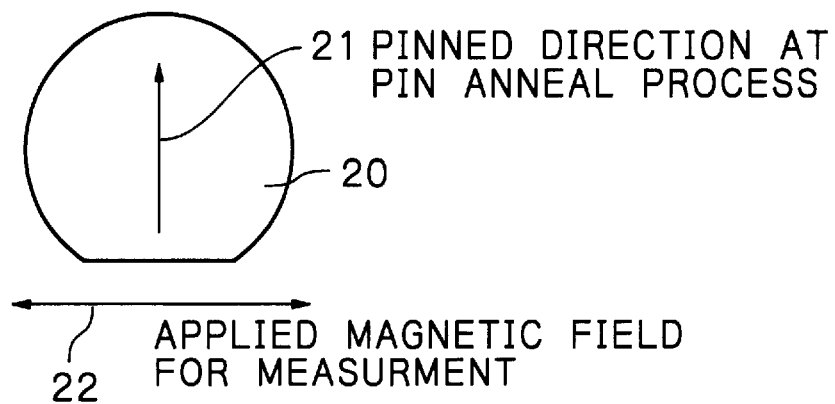
FIGS. 2a to 2c illustrate a method to measure the rotation angle of the direction of the magnetization of the pinned layer.
Figure 2B:
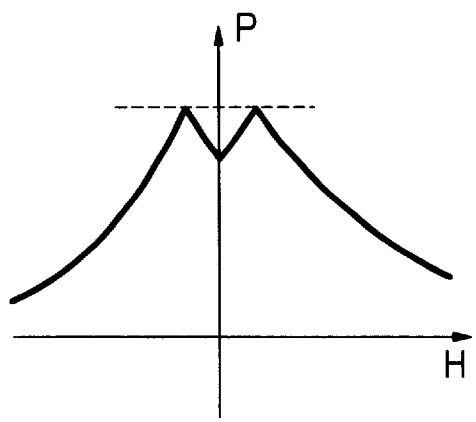
Figure 2C:
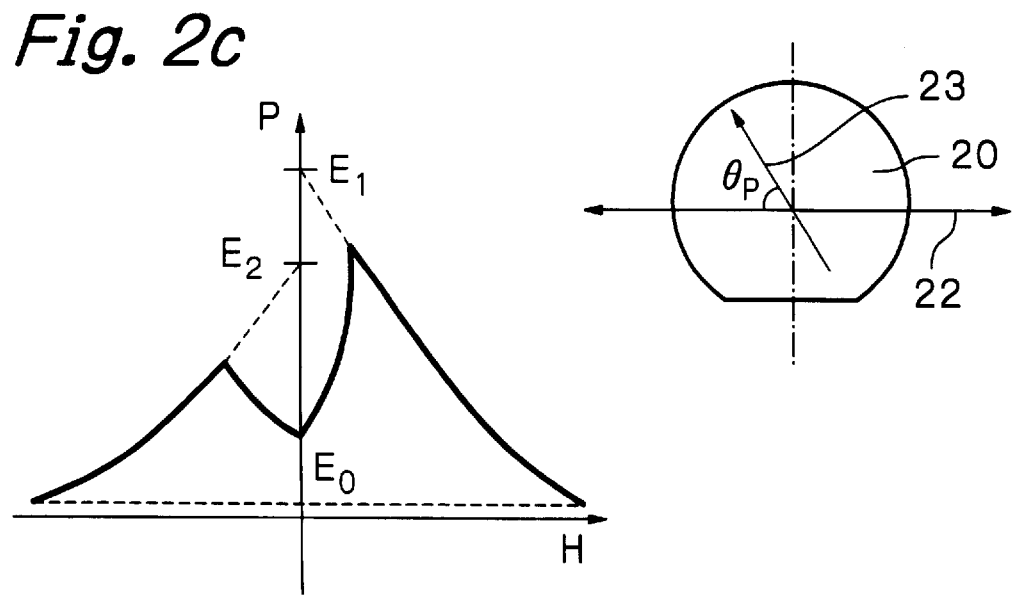

The rotated angle of the pinned direction can be easily calculated from the output level of the spin valve effect sensor. Namely, as shown in FIG. 2a, first a magnetic field 22, which is perpendicular to the original pinned direction 21 provided at the annealing process, is applied to the wafer 20, then ρ-H loop is measured. If there is no rotation of the pinned direction, the measured ρ-H loop is horizontally symmetrical as shown in FIG. 2b. If there is definite rotation of the pinned direction, the measured ρ-H loop becomes horizontally unsymmetrical as shown in FIG. 2c. Assuming $\theta_p$ as the angle difference between the rotated pinned direction 23 and the applied measurement field direction 22, the following equation is formulated, $(E_1-E_0)/(E_2-E_0) = \{(1-\cos\theta_p)/2\}/\{(1+\cos\theta_p)/2\}$. Consequently $\theta_p$ is given the next equation, $\theta_p = \cos^{-1}\{(E_1-E_0)/(E_2-E_1+2E_0)\}$. The rotation angle of the pinned direction is given by $90° - \theta_p$.

SECOND EXAMPLE

A second example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of $Co_{90}Fe_{10}$ (Co is 90 at % and Fe is 10 at %) with the thickness of 1.0 or 2.0 nm and a ferromagnetic material layer 12a of $Ni_{80}Fe_{20}$ (Ni is 80 at % and Fe is 20 at %) with the thickness of 0–4.0 nm, which has a smaller magnetic anisotropy than that of Co, and an anti-ferromagnetic material layer 13 of FeMn with the thickness of 12.0 nm, in this order.

Tables 3 and 4 show measured result of heat stability of the pinned direction when the thickness of the NiFe layer 12a of the pinned layer 12 is changed. In these Tables, Hk of the pinned layer corresponds to magnetic anisotropy factor of the pinned layer. Table 3 is in a case that the thickness of the CoFe layer 12b of the pinned layer 12 is 1.0 nm, whereas Table 4 is in a case that the thickness is 2.0 nm. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 3

Ta(5 nm)/NiFe(9 nm)/Co(1 nm)/Cu(3 nm)/Co$_{90}$Fe$_{10}$(1 nm)/Ni$_{80}$Fe$_{20}$(x)/FeMn(12 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 6 | 8 | 13 | 15 |
| 3.5 | 7 | 9 | 13 | 16 |
| 3.0 | 9 | 9 | 12 | 16 |
| 2.5 | 13 | 10 | 14 | 18 |
| 2.0 | 15 | 11 | 16 | 20 |
| 1.5 | 17 | 11 | 18 | 23 |
| 1.0 | 20 | 12 | 20 | 26 |
| 0.5 | 22 | 15 | 23 | 30 |
| No NiFe Layer | 24 | 16 | 24 | 32 |

TABLE 4

Ta(5 nm)/NiFe(9 nm)/Co(1 nm)/Cu(3 nm)/Co$_{90}$Fe$_{10}$(2 nm)/Ni$_{80}$Fe$_{20}$(x)/FeMn(12 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 8 | 10 | 14 | 17 |
| 3.5 | 10 | 11 | 15 | 18 |
| 3.0 | 12 | 12 | 16 | 18 |
| 2.5 | 16 | 12 | 16 | 20 |
| 2.0 | 18 | 13 | 19 | 22 |
| 1.5 | 20 | 14 | 21 | 25 |
| 1.0 | 23 | 15 | 22 | 28 |
| 0.5 | 25 | 17 | 23 | 32 |
| No NiFe Layer | 26 | 20 | 27 | 37 |

As will be apparent from these Tables 3 and 4, the rotated angle of the pinned direction decreased, namely the heat stability of the pinned direction improved by forming the NiFe layer 12a in the pinned layer 12. Also, as will be understood from Table 3, in case the thickness of the CoFe layer 12b is 1.0 nm, if the NiFe layer 12a is formed with a thickness of 2.0 nm or more, the rotated angle of the pinned direction after 1000 hours stress of heat and magnetic field becomes 20 degrees or less. Furthermore, as will be noted from Table 4, in case the thickness of the CoFe layer 12b is 2.0 nm, if the NiFe layer 12a is formed with a thickness of 2.5 nm or more, the rotated angle of the pinned direction after 1000 hours stress of heat and magnetic field becomes 20 degrees or less. As a result, degradation of the electrical output characteristics of the MR sensor due to rotation of the pinned direction during operation under the stress of about 125° C. temperature can be kept 6.0% or less.

THIRD EXAMPLE

A third example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 or 2.0 nm and a ferromagnetic material layer 12a of Ni$_{80}$Fe$_{20}$ (Ni is 80 at % and Fe is 20 at %) with the thickness of 0–4.0 nm, which has a smaller magnetic anisotropy than that of Co, and an anti-ferromagnetic material layer 13 of RuRhMn with the thickness of 10.0 nm, in this order.

Tables 5 and 6 show measured result of heat stability of the pinned direction when the thickness of the NiFe layer 12a of the pinned layer 12 is changed. In these Tables, Hk of the pinned layer corresponds to magnetic anisotropy factor of the pinned layer. Table 5 is in a case that the thickness of the Co layer 12b of the pinned layer 12 is 1.0 nm, whereas Table 6 is in a case that the thickness is 2.0 nm. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 5

Ta(5 nm)/NiFe(9 nm)/Co(1 nm)/Cu(3 nm)/Co(1 nm)/Ni$_{80}$Fe$_{20}$(x)/RuRhMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 5 | 2 | 2 | 3 |
| 3.5 | 9 | 4 | 5 | 8 |
| 3.0 | 12 | 5 | 8 | 10 |
| 2.5 | 15 | 6 | 9 | 12 |
| 2.0 | 17 | 6 | 11 | 15 |
| 1.5 | 19 | 7 | 13 | 18 |
| 1.0 | 23 | 10 | 14 | 22 |
| 0.5 | 26 | 12 | 16 | 25 |
| No NiFe Layer | 28 | 18 | 23 | 34 |

TABLE 6

Ta(5 nm)/NiFe(9 nm)/Co(1 nm)/Cu(3 nm)/Co(2 nm)/Ni$_{80}$Fe$_{20}$(x)/RuRhMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 10 | 4 | 5 | 7 |
| 3.5 | 12 | 6 | 7 | 10 |
| 3.0 | 16 | 7 | 9 | 12 |
| 2.5 | 18 | 8 | 11 | 14 |
| 2.0 | 21 | 8 | 13 | 17 |
| 1.5 | 23 | 9 | 15 | 20 |
| 1.0 | 27 | 12 | 16 | 24 |
| 0.5 | 29 | 14 | 18 | 27 |
| No NiFe Layer | 30 | 20 | 26 | 37 |

As will be apparent from these Tables 5 and 6, the rotated angle of the pinned direction decreased, namely the heat stability of the pinned direction improved by forming the NiFe layer 12a in the pinned layer 12. Also, as will be understood from Table 5, in case the thickness of the Co layer 12b is 1.0 nm, if the NiFe layer 12a is formed with a thickness of 3.0 nm or more, the rotated angle of the pinned direction after 1000 hours stress of heat and magnetic field becomes 10 degrees or less. Furthermore, as will be noted from Table 6, in case the thickness of the Co layer 12b is 2.0 nm, if the NiFe layer 12a is formed with a thickness of 3.5 nm or more, the rotated angle of the pinned direction after 1000 hours stress of heat and magnetic field becomes 10 degrees or less. As a result, degradation of the electrical output characteristics of the MR sensor due to rotation of the pinned direction during operation under the stress of about 125° C. temperature can be kept 1.5% or less.

FOURTH EXAMPLE

A fourth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 or 2.0 nm and a ferromagnetic material layer 12a of $Ni_{80}Fe_{20}$ (Ni is 80 at % and Fe is 20 at %) with the thickness of 0–4.0 nm, which has a smaller magnetic anisotropy than that of Co, and an anti-ferromagnetic material layer 13 of FeMn with the thickness of 10.0 nm, in this order.

Tables 7 and 8 show measured result of heat stability of the pinned direction when the thickness of the NiFe layer 12a of the pinned layer 12 is changed. In these Tables, Hk of the pinned layer corresponds to magnetic anisotropy factor of the pinned layer. Table 7 is in a case that the thickness of the Co layer 12b of the pinned layer 12 is 1.0 nm, whereas Table 8 is in a case that the thickness is 2.0 nm. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 7

Ta(5 nm)/NiFe(9 nm)/Co(1 nm)/Cu(3 nm)/Co(1 nm)/Ni$_{80}$Fe$_{20}$(x)/FeMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 5 | 5 | 5 | 6 |
| 3.5 | 9 | 9 | 12 | 17 |
| 3.0 | 12 | 10 | 14 | 18 |

TABLE 7-continued

Ta(5 nm)/NiFe(9 nm)/Co(1 nm)/Cu(3 nm)/Co(1 nm)/Ni$_{80}$Fe$_{20}$(x)/FeMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 2.5 | 15 | 11 | 16 | 20 |
| 2.0 | 17 | 11 | 19 | 23 |
| 1.5 | 19 | 12 | 21 | 26 |
| 1.0 | 23 | 15 | 21 | 30 |
| 0.5 | 26 | 17 | 24 | 34 |
| No NiFe Layer | 28 | 23 | 29 | 38 |

TABLE 8

Ta(5 nm)/NiFe(9 nm)/Co(1 nm)/Cu(3 nm)/Co(2 nm)/Ni$_{80}$Fe$_{20}$(x)/FeMn(10 nm)

| Thickness of NiFe Layer of Pinned Layer (nm) | Hk of Pinned Layer (Oe) | Rotated angle of Pinned Direction (Degrees) | | |
|---|---|---|---|---|
| | | 24 Hours | 100 Hours | 1000 Hours |
| 4.0 | 10 | 11 | 15 | 18 |
| 3.5 | 12 | 12 | 16 | 19 |
| 3.0 | 16 | 12 | 17 | 20 |
| 2.5 | 18 | 13 | 19 | 22 |
| 2.0 | 21 | 14 | 21 | 26 |
| 1.5 | 23 | 15 | 22 | 28 |
| 1.0 | 27 | 17 | 23 | 32 |
| 0.5 | 29 | 19 | 25 | 36 |
| No NiFe Layer | 30 | 25 | 31 | 40 |

As will be apparent from these Tables 7 and 8, the rotated angle of the pinned direction decreased, namely the heat stability of the pinned direction improved by forming the NiFe layer 12a in the pinned layer 12. Also, as will be understood from Table 7, in case the thickness of the Co layer 12b is 1.0 nm, if the NiFe layer 12a is formed with a thickness of 2.5 nm or more, the rotated angle of the pinned direction after 1000 hours stress of heat and magnetic field becomes 20 degrees or less. Furthermore, as will be noted from Table 8, in case the thickness of the Co layer 12b is 2.0 nm, if the NiFe layer 12a is formed with a thickness of 3.0 nm or more, the rotated angle of the pinned direction after 1000 hours stress of heat and magnetic field becomes 20 degrees or less. As a result, degradation of the electrical output characteristics of the MR sensor due to rotation of the pinned direction during operation under the stress of about 125° C. temperature can be kept 6.0% or less.

FIRST CONVENTIONAL EXAMPLE

A first conventional example for comparison of the multi-layered spin valve effect structure with a pinned layer in a single layered structure was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) composed of a $Ni_{80}Fe_{20}$ (Ni is 80 at % and Fe is 20 at %) layer with the thickness of 9.0 nm and a Co layer with the thickness of 1.0 nm, a non-magnetic metallic material layer of Cu with the thickness of 3.0 nm, a ferromagnetic material layer (pinned layer) having the single layered structure of FeCo alloy with the thickness of 2.0 nm, and an anti-ferromagnetic material layer of FeMn with the thickness of 12.0 nm, in this order.

Table 9 shows measured result of heat stability of the pinned direction when the composition of Co in the FeCo alloy of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 9

Ta(5 nm)/NiFe(9 nm)/Co(1 nm)/Cu(3 nm)/FeCo(2 nm)/FeMn(12 nm)

| Composition of Co in Pinned Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 20 | 15 | 25 | 30 |
| 10 | 19 | 15 | 24 | 29 |
| 20 | 17 | 14 | 22 | 26 |
| 30 | 15 | 14 | 19 | 23 |
| 40 | 12 | 12 | 16 | 19 |
| 50 | 15 | 14 | 19 | 23 |
| 60 | 17 | 14 | 22 | 26 |
| 70 | 19 | 15 | 24 | 29 |
| 80 | 23 | 18 | 24 | 33 |
| 90 | 26 | 20 | 27 | 37 |
| 100 | 30 | 23 | 29 | 40 |

As will be apparent from Table 9, if the pinned layer is formed in the single layered structure, the rotated angle of the pinned direction after 1000 hours stress of heat and magnetic field will never become 20 degrees or less in most cases. As a result, degradation of the electrical output characteristics of the MR sensor due to rotation of the pinned direction during operation under the stress of about 125° C. temperature seriously increases.

SECOND CONVENTIONAL EXAMPLE

Similarly, a second conventional example for comparison of the multi-layered spin valve effect structure with a pinned layer in a single layered structure was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) composed of a $Ni_{80}Fe_{20}$ (Ni is 80 at % and Fe is 20 at %) layer with the thickness of 9.0 nm and a Co layer with the thickness of 1.0 nm, a non-magnetic metallic material layer of Cu with the thickness of 3.0 nm, a ferromagnetic material layer (pinned layer) having the single layered structure of FeCo alloy with the thickness of 2.0 nm, and an anti-ferromagnetic material layer of RuRhMn with the thickness of 10.0 nm, in this order.

Table 10 shows measured result of heat stability of the pinned direction when the composition of Co in the FeCo alloy of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 10

Ta(5 nm)/NiFe(9 nm)/Co(1 nm)/Cu(3 nm)/FeCo(2 nm)/RuRhMn(10 nm)

| Composition of Co in Pinned Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 20 | 12 | 22 | 27 |
| 10 | 19 | 12 | 21 | 26 |
| 20 | 17 | 11 | 19 | 23 |
| 30 | 15 | 11 | 16 | 20 |
| 40 | 12 | 9 | 13 | 16 |
| 50 | 15 | 11 | 16 | 20 |
| 60 | 17 | 11 | 19 | 23 |
| 70 | 19 | 12 | 21 | 26 |
| 80 | 23 | 15 | 21 | 30 |
| 90 | 26 | 17 | 24 | 34 |
| 100 | 30 | 20 | 26 | 37 |

As will be apparent from Table 10, if the pinned layer is formed in the single layered structure, the rotated angle of the pinned direction after 1000 hours stress of heat and magnetic field will never become 20 degrees or less in most cases. As a result, degradation of the electrical output characteristics of the MR sensor due to rotation of the pinned direction during operation under the stress of about 125° C. temperature seriously increases.

FIFTH EXAMPLE

A fifth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of FeSi with the thickness of 4.0 nm, which has a smaller magnetic anisotropy than that of Co, and an anti-ferromagnetic material layer 13 of FeMn with the thickness of 10.0 nm, in this order.

Table 11 shows measured result of heat stability of the pinned direction when the composition of Si in the FeSi layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 11

Ta(5 nm)/NiFe(9 nm)/Co(1 nm)/Cu(3 nm)/FeSi(4 nm)/FeMn(10 nm)

| Composition of Si in FeSi Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 20 | 15 | 25 | 30 |
| 4 | 19 | 15 | 24 | 29 |
| 8 | 17 | 14 | 22 | 26 |
| 12 | 15 | 14 | 19 | 23 |
| 16 | 12 | 12 | 16 | 19 |
| 20 | 10 | 11 | 14 | 17 |
| 24 | 12 | 12 | 16 | 19 |
| 28 | 15 | 14 | 19 | 23 |
| 32 | 16 | 14 | 20 | 24 |
| 36 | 18 | 15 | 23 | 28 |
| 40 | 20 | 15 | 25 | 30 |

As will be apparent from Table 11, the rotated angle of the pinned direction decreased, namely the heat stability of the pinned direction improved by forming the FeSi layer 12a in the pinned layer 12. Also, as will be understood from Table 11, if the composition of Si in the FeSi layer 12a is 16–24 at %, the rotated angle of the pinned direction after 1000 hours stress of heat and magnetic field becomes 20 degrees or less. As a result, degradation of the electrical output characteristics of the MR sensor due to rotation of the pinned direction during operation under the stress of about 125° C. temperature can be kept at sufficiently low degree.

SIXTH EXAMPLE

A sixth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of FeSi with the thickness of 4.0 nm, which has a smaller magnetic anisotropy than that of Co, and an anti-ferromagnetic material layer 13 of RuRhMn with the thickness of 10.0 nm, in this order.

Table 12 shows measured result of heat stability of the pinned direction when the composition of Si in the FeSi layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 12

Ta(5 nm)/NiFe(9 nm)/Co(1 nm)/Cu(3 nm)/FeSi(4 nm)/RuRhMn(10 nm)

| Composition of Si in FeSi Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 20 | 12 | 22 | 27 |
| 4 | 19 | 12 | 21 | 26 |
| 8 | 17 | 11 | 19 | 23 |
| 12 | 15 | 11 | 16 | 20 |
| 16 | 12 | 9 | 13 | 16 |
| 20 | 10 | 8 | 11 | 14 |
| 24 | 12 | 9 | 13 | 16 |
| 28 | 15 | 12 | 16 | 20 |
| 32 | 16 | 15 | 17 | 21 |
| 36 | 18 | 16 | 20 | 25 |
| 40 | 20 | 20 | 22 | 27 |

As will be apparent from Table 12, the rotated angle of the pinned direction decreased, namely the heat stability of the pinned direction improved by forming the FeSi layer 12a in the pinned layer 12. Also, as will be understood from Table 11, if the composition of Si in the FeSi layer 12a is 16–24 at %, the rotated angle of the pinned direction after 1000 hours stress of heat and magnetic field becomes 20 degrees or less. As a result, degradation of the electrical output characteristics of the MR sensor due to rotation of the pinned direction during operation under the stress of about 125° C. temperature can be kept at sufficiently low degree.

SEVENTH EXAMPLE

A seventh example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of FeNi with the thickness of 4.0 nm, which has a smaller magnetic anisotropy than that of Co, and an anti-ferromagnetic material layer 13 of FeMn with the thickness of 12.0 nm, in this order.

Table 13 shows measured result of heat stability of the pinned direction when the composition of Ni in the FeNi layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 13

Ta(5 nm)/NiFe(9 nm)/Co(1 nm)/Cu(3 nm)/FeNi(4 nm)/FeMn(12 nm)

| Composition of Ni in FeNi Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 22 | 17 | 25 | 32 |
| 10 | 12 | 12 | 16 | 19 |
| 20 | 5 | 5 | 5 | 6 |
| 30 | 8 | 9 | 9 | 11 |
| 40 | 10 | 11 | 14 | 17 |
| 50 | 12 | 12 | 18 | 19 |
| 60 | 13 | 13 | 17 | 21 |
| 70 | 10 | 11 | 14 | 17 |
| 80 | 5 | 5 | 5 | 8 |
| 90 | 9 | 10 | 11 | 14 |
| 100 | 14 | 13 | 18 | 22 |

As will be apparent from Table 13, the rotated angle of the pinned direction decreased, namely the heat stability of the pinned direction improved by forming the FeNi layer 12a in the pinned layer 12. Also, as will be understood from Table 13, if Ni is contained in the layer 12a, the rotated angle of the pinned direction after 1000 hours stress of heat and magnetic field becomes 20 degrees or less. Particularly, if the composition of Ni in the FeNi layer 12a is 20–80 at %, the rotated angle becomes very small as 6 degrees. As a result, degradation of the electrical output characteristics of the MR sensor due to rotation of the pinned direction during operation under the stress of about 125° C. temperature can be kept at extremely low degree.

EIGHTH EXAMPLE

A eighth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of FeNi with the thickness of 4.0 nm, which has a smaller magnetic anisotropy than that of Co, and an anti-ferromagnetic material layer 13 of RuRhMn with the thickness of 10.0 nm, in this order.

Table 14 shows measured result of heat stability of the pinned direction when the composition of Ni in the FeNi layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 14

Ta(5 nm)/NiFe(9 nm)/Co(1 nm)/Cu(3 nm)/FeNi(4 nm)/RuRhMn(10 nm)

| Composition of Ni in FeNi Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 22 | 14 | 22 | 29 |
| 10 | 12 | 9 | 13 | 16 |
| 20 | 5 | 2 | 2 | 3 |
| 30 | 8 | 5 | 6 | 8 |
| 40 | 10 | 8 | 11 | 14 |
| 50 | 12 | 9 | 13 | 16 |
| 60 | 13 | 10 | 14 | 16 |
| 70 | 10 | 8 | 11 | 14 |
| 80 | 5 | 2 | 2 | 3 |
| 90 | 9 | 7 | 8 | 11 |
| 100 | 14 | 10 | 15 | 19 |

As will be apparent from Table 14, the rotated angle of the pinned direction decreased, namely the heat stability of the pinned direction improved by forming the FeNi layer 12a in the pinned layer 12. Also, as will be understood from Table 14, if Ni is contained in the layer 12a, the rotated angle of the pinned direction after 1000 hours stress of heat and magnetic field becomes 20 degrees or less. Particularly, if the composition of Ni in the FeNi layer 12a is 20–80 at %, the rotated angle becomes very small as 3 degrees. As a result, degradation of the electrical output characteristics of the MR sensor due to rotation of the pinned direction during operation under the stress of about 125° C. temperature can be kept at extremely low degree.

THIRD CONVENTIONAL EXAMPLE

A third conventional example for comparison of the multi-layered spin valve effect structure with a pinned layer in a single layered structure was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) composed of a NiFe layer with the thickness of 9.0 nm and a Co layer with the thickness of 1.0 nm, a non-magnetic metallic material layer of Cu with the thickness of 3.0 nm, a ferromagnetic material layer (pinned layer) having the single layered structure of NiCo alloy with the thickness of 2.0 nm, and an anti-ferromagnetic material layer of FeMn with the thickness of 12.0 nm, in this order.

Table 15 shows measured result of heat stability of the pinned direction when the composition of Co in the NiCo alloy of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 15

Ta(5 nm)/NiFe(9 nm)/Co(1 nm)/Cu(3 nm)/NiCo(2 nm)/FeMn(12 nm)

| Composition of Co in Pinned Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 14 | 13 | 18 | 22 |
| 10 | 9 | 10 | 11 | 14 |
| 20 | 13 | 13 | 17 | 21 |
| 30 | 16 | 14 | 20 | 24 |
| 40 | 19 | 15 | 24 | 29 |
| 50 | 20 | 15 | 25 | 30 |
| 60 | 22 | 17 | 25 | 32 |
| 70 | 24 | 18 | 25 | 35 |
| 80 | 27 | 21 | 27 | 37 |
| 90 | 28 | 22 | 28 | 38 |
| 100 | 30 | 23 | 29 | 40 |

TABLE 16

Ta(5 nm)/NiFe(9 nm)/Co(1 nm)/Cu(3 nm)/NiCo(2 nm)/RuRhMn(10 nm)

| Composition of Co in Pinned Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0 | 14 | 10 | 15 | 19 |
| 10 | 9 | 7 | 8 | 11 |
| 20 | 13 | 10 | 14 | 18 |
| 30 | 16 | 11 | 17 | 21 |
| 40 | 19 | 12 | 21 | 26 |
| 50 | 20 | 12 | 22 | 27 |
| 60 | 22 | 14 | 22 | 29 |
| 70 | 24 | 15 | 22 | 32 |
| 80 | 27 | 18 | 24 | 34 |
| 90 | 28 | 19 | 25 | 35 |
| 100 | 30 | 20 | 26 | 37 |

As will be apparent from Table 15, if the pinned layer is formed in the single layered structure, the rotated angle of the pinned direction after 1000 hours stress of heat and magnetic field will never become 20 degrees or less in most cases. As a result, degradation of the electrical output characteristics of the MR sensor due to rotation of the pinned direction during operation under the stress of about 125° C. temperature seriously increases.

FOURTH CONVENTIONAL EXAMPLE

A fourth conventional example for comparison of the multi-layered spin valve effect structure with a pinned layer in a single layered structure was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) composed of a NiFe layer with the thickness of 9.0 nm and a Co layer with the thickness of 1.0 nm, a non-magnetic metallic material layer of Cu with the thickness of 3.0 nm, a ferromagnetic material layer (pinned layer) having the single layered structure of NiCo alloy with the thickness of 2.0 nm, and an anti-ferromagnetic material layer of RuRhMn with the thickness of 10.0 nm, in this order.

Table 16 shows measured result of heat stability of the pinned direction when the composition of Co in the NiCo alloy of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after stress of 125° C. temperature which will be the maximum temperature of the MR sensor actually operating in the HDD under the application of simulated magnetic field from the hard magnets of 190 Oe toward perpendicular to the original pinned direction provided during the annealing process.

As will be apparent from Table 16, if the pinned layer is formed in the single layered structure, the rotated angle of the pinned direction after 1000 hours stress of heat and magnetic field will never become 20 degrees or less in most cases. As a result, degradation of the electrical output characteristics of the MR sensor due to rotation of the pinned direction during operation under the stress of about 125° C. temperature seriously increases.

NINTH EXAMPLE

A ninth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of NiCu with the thickness of 4.0 nm, which has a smaller magnetic anisotropy than that of Co, and an anti-ferromagnetic material layer 13 of FeMn with the thickness of 12.0 nm, in this order.

Table 17 shows measured result of heat stability of the pinned direction when the composition of Cu in the NiCu layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

TABLE 17

Ta(5 nm)/NiFe(9 nm)/Co(1 nm)/Cu(3 nm)/NiCu(4 nm)/FeMn(12 nm)

| Composition of Cu in NiCu Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0  | 14 | 13 | 18 | 22 |
| 5  | 13 | 13 | 17 | 21 |
| 10 | 13 | 13 | 17 | 21 |
| 15 | 12 | 12 | 16 | 19 |
| 20 | 11 | 11 | 15 | 18 |
| 25 | 11 | 11 | 15 | 18 |
| 30 | 10 | 11 | 14 | 17 |
| 35 | 9  | 10 | 11 | 14 |
| 40 | 10 | 11 | 14 | 17 |
| 45 | 11 | 11 | 15 | 18 |
| 50 | 13 | 13 | 17 | 21 |

TABLE 18

Ta(5 nm)/NiFe(9 nm)/Co(1 nm)/Cu(3 nm)/NiCu(4 nm)/RuRhMn(10 nm)

| Composition of Cu in NiCu Layer (at %) | Hk of Pinned Layer (Oe) | Rotated angle of Pinned Direction (Degrees) | | |
|---|---|---|---|---|
| | | 24 Hours | 100 Hours | 1000 Hours |
| 0  | 14 | 10 | 15 | 19 |
| 5  | 13 | 10 | 14 | 18 |
| 10 | 13 | 10 | 14 | 18 |
| 15 | 12 | 9  | 13 | 16 |
| 20 | 11 | 8  | 12 | 15 |
| 25 | 11 | 8  | 12 | 15 |
| 30 | 10 | 8  | 11 | 14 |
| 35 | 9  | 7  | 8  | 11 |
| 40 | 10 | 8  | 11 | 14 |
| 45 | 11 | 8  | 12 | 15 |
| 50 | 13 | 10 | 14 | 18 |

As will be apparent from Table 17, the rotated angle of the pinned direction decreased, namely the heat stability of the pinned direction improved by forming the NiCu layer 12a in the pinned layer 12. Also, as will be understood from Table 13, if Cu is contained in the layer 12a, the rotated angle of the pinned direction after 1000 hours stress of heat and magnetic field becomes 20 degrees or less. Particularly, if the composition of Cu in the NiCu layer 12a is 15–45 at %, the rotated angle becomes very small. As a result, degradation of the electrical output characteristics of the MR sensor due to rotation of the pinned direction during operation under the stress of about 125° C. temperature can be kept at extremely low degree.

TENTH EXAMPLE

A tenth example of the multi-layered spin valve effect structure as illustrated in FIG. 1 was actually fabricated by depositing multi-layers under application of magnetic field without heating the substrate. Concretely, the multi-layered structure was formed by sequentially depositing, on the substrate of AlTiC, an under layer of Ta with the thickness of 5.0 nm, a ferromagnetic material layer (free layer) 10 composed of a NiFe layer with the thickness of 9.0 nm and a Co layer with the thickness of 1.0 nm, a non-magnetic metallic material layer 11 of Cu with the thickness of 3.0 nm, a ferromagnetic material layer (pinned layer) 12 having a two layered structure composed of a ferromagnetic material layer 12b of Co with the thickness of 1.0 nm and a ferromagnetic material layer 12a of NiCu with the thickness of 4.0 nm, which has a smaller magnetic anisotropy than that of Co, and an anti-ferromagnetic material layer 13 of RuRhMn with the thickness of 10.0 nm, in this order.

Table 18 shows measured result of heat stability of the pinned direction when the composition of Cu in the NiCu layer of the pinned layer is changed. In this Table, Hk of the pinned layer corresponds to magnetic anisotropy factor of the pinned layer. The heat stability of the pinned direction was detected by measuring the rotated angle of the pinned direction of the multi-layered spin valve effect structure after the stress of 125° C. temperature which will be the maximum temperature of the MR sensor actually operating in the HDD under the application of simulated magnetic field from the hard magnets of 190 Oe toward perpendicular to the original pinned direction provided during the annealing process.

As will be apparent from Table 18, the rotated angle of the pinned direction decreased, namely the heat stability of the pinned direction improved by forming the NiCu layer 12a in the pinned layer 12. Also, as will be understood from Table 13, if Cu is contained in the layer 12a, the rotated angle of the pinned direction after 1000 hours stress of heat and magnetic field becomes 20 degrees or less. As a result, degradation of the electrical output characteristics of the MR sensor due to rotation of the pinned direction during operation under the stress of about 125° C. temperature can be kept at extremely low degree.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect multi-layered structure, comprising:
   a non-magnetic electrically conductive material layer;
   first and second ferromagnetic material layers separated by said non-magnetic electrically conductive material layer; and
   an anti-ferromagnetic material layer formed adjacent to and in physical contact with one surface of said second ferromagnetic material layer, said one surface being located on a side opposite of said non-magnetic electrically conductive material layer,
   said second ferromagnetic material layer including a first non-amorphous layer made of Co, said first non-amorphous layer being stacked on said non-magnetic electrically conductive material layer, and a second layer of a ferromagnetic material with a smaller magnetic anisotropy than that of Co, said second layer being stacked on said first non-amorphous layer.

2. The structure as claimed in claim 1, wherein said second layer is made of an Fe alloy.

3. The structure as claimed in claim 2, wherein said ferromagnetic material of Fe alloy is selected from a group of ferromagnetic materials consisting essentially of CoFe, FeSi and NiFe.

4. The structure as claimed in claim 1, wherein said second layer is made of an Ni alloy.

5. The structure as claimed in claim 4, wherein said ferromagnetic material of Ni alloy is selected from a group of ferromagnetic materials consisting essentially of FeNi, NiCo and NiCu.

6. The structure as claimed in claim 1, wherein said second layer is made of an amorphous magnetic material alloy.

7. The structure as claimed in claim 1, wherein said second layer has a thickness of 0.5 nm or more.

8. A thin-film magnetic head with a magnetoresistive effect multi-layered structure, said structure comprising:

a non-magnetic electrically conductive material layer;

first and second ferromagnetic material layers separated by said non-magnetic electrically conductive material layer; and an anti-ferromagnetic material layer formed adjacent to and in physical contact with one surface of said second ferromagnetic material layer, said one surface being located on a side opposite of said non-magnetic electrically conductive material layer, said second ferromagnetic material layer including a first non-amorphous layer made of Co, said first non-amorphous layer being stacked on said non-magnetic electrically conductive material layer, and a second layer of a ferromagnetic material with a smaller magnetic anisotropy than that of Co, said second layer being stacked on said first non-amorphous layer.

9. The head as claimed in claim 8, wherein said second layer is made of an Fe alloy.

10. The head as claimed in claim 9, wherein said ferromagnetic material of Fe alloy is selected from a group of ferromagnetic materials consisting essentially of CoFe, FeSi and NiFe.

11. The head as claimed in claim 8, wherein said second layer is made of an Ni alloy.

12. The head as claimed in claim 11 wherein said ferromagnetic material of Ni alloy is selected from a group of ferromagnetic materials consisting essentially of FeNi, NiCo and NiCu.

13. The head as claimed in claim 8, wherein said second layer is made of an amorphous magnetic material alloy.

14. The head as claimed in claim 8, wherein said second layer has a thickness of 0.5 nm or more.

* * * * *